(12) United States Patent
Sheikholeslami et al.

(10) Patent No.: US 12,210,966 B2
(45) Date of Patent: Jan. 28, 2025

(54) METHOD AND SYSTEM FOR PROBABLY ROBUST CLASSIFICATION WITH DETECTION OF ADVERSARIAL EXAMPLES

(71) Applicant: Robert Bosch GmbH, Stuttgart (DE)

(72) Inventors: Fatemeh Sheikholeslami, Pittsburgh, PA (US); Jeremy Kolter, Pittsburgh, PA (US); Ali Lotfi Rezaabad, Austin, TX (US)

(73) Assignee: Robert Bosch GmbH (DE)

( * ) Notice: Subject to any disclaimer, the term of this patent is extended or adjusted under 35 U.S.C. 154(b) by 1121 days.

(21) Appl. No.: 17/035,203

(22) Filed: Sep. 28, 2020

(65) Prior Publication Data

US 2022/0101116 A1    Mar. 31, 2022

(51) Int. Cl.
*G06N 7/01* (2023.01)
*G06N 3/04* (2023.01)
*G06N 3/048* (2023.01)
*G06N 3/08* (2023.01)

(52) U.S. Cl.
CPC .................. *G06N 3/08* (2013.01); *G06N 3/04* (2013.01)

(58) Field of Classification Search
CPC .......... G06N 3/08; G06N 3/0895; G06N 3/09; G06N 3/091; G06N 3/094; G06N 3/096; G06N 3/098; G06N 3/0985; G06N 3/04; G06N 3/0464; G06N 3/0475; G06N 3/0495; G06N 3/0499; G06N 5/01; G06N 3/084; G06N 20/00
See application file for complete search history.

(56) References Cited

U.S. PATENT DOCUMENTS

2023/0040889 A1*  2/2023  Teig .......................... G06N 7/01

FOREIGN PATENT DOCUMENTS

CN           111695596 A *  9/2020   ........... G06K 9/6268

OTHER PUBLICATIONS

Jia, Robin et al., Certified Robustness to Adversarial Word Substitutions, Nov. 25, 2019, Proceedings of the 2019 Conference on Empirical Methods in Natural Language Processing and the 9th International Joint Conference on Natural Language Processing (Year: 2019).*

(Continued)

*Primary Examiner* — Brandon S Cole
(74) *Attorney, Agent, or Firm* — Dickinson Wright PLLC

(57) ABSTRACT

A computer-implemented method for training a machine-learning network includes receiving an input data from a sensor, wherein the input data includes a perturbation, wherein the input data is indicative of image, radar, sonar, or sound information, obtain a worst-case bound on a classification error and loss for perturbed versions of the input data, utilizing at least bounding of one or more hidden layer values, in response to the input data, train a classifier, wherein the classifier includes a plurality of classes, including an additional abstain class, wherein the abstain class is determined in response to at least bounding the input data, outputting a classification in response to the input data, and output a trained classifier configured to detect the additional abstain class in response to the input data classifier with a plurality of classes, including an additional abstain class.

20 Claims, 8 Drawing Sheets

(56) References Cited

OTHER PUBLICATIONS

Laidlaw, Cassidy et al., Playing it Safe: Adversarial Robustness with an Abstain Option, Nov. 2019, arXiv preprint arXiv: 1911.11253 (Year: 2019).*
Madry et al., "Towards deep learning models resistant to adversarial attacks", arXiv preprint arXiv:1706.06083, Sep. 2019, 28 pages.
Raghunathan et al., "Certified defenses against adversarial examples", ICLR Jan. 2018, arXiv:1801.09344v1, 15 pages.
Gowal et al., "On the effectiveness of interval bound propagation for training verifiably robust models", arXiv 1810.12715, Aug. 2019, 16 pages.
Wong et al., "Scaling provable adversarial defenses", In Advances in Neural Information Processing Systems, Nov. 2018, 22 pages.
Zhang et al., "Towards stable and efficient training of verifiably robust neural networks". arXiv preprint arXiv:1906.06316., Nov. 2019, 25 pages.
Laidlaw et al., "Playing it Safe: Adversarial Robustness with an Abstain Option" arXiv preprint arXiv:1911.11253, Nov. 2019, 14 pages.
Tramer et al., "On adaptive attacks to adversarial example defenses", arXiv preprint arXiv:2002.08347, Feb. 2020, 43 pages.

\* cited by examiner

METHOD AND SYSTEM FOR PROBABLY ROBUST CLASSIFICATION WITH DETECTION OF ADVERSARIAL EXAMPLES

TECHNICAL FIELD

The present disclosure relates to augmentation and image processing of an image utilizing machine learning.

BACKGROUND

Machine learning networks may have adversarial training of neural networks for classification. The classifier performance may be robustified against such perturbations, but such systems may lack provable performance guarantees. Such networks have been increasingly shown to be lacking robustness.

SUMMARY

According to one embodiment, a computer-implemented method for training a machine-learning network includes receiving an input data from a sensor, wherein the input data set includes a perturbation, wherein the input data is indicative of image, radar, sonar, or sound information, obtain a worst-case bound on a classification error and loss for perturbed versions of the input data, utilizing at least bounding of one or more hidden layer values, in response to the input data, train a classifier, wherein the classifier includes a plurality of classes, including an additional abstain class, wherein the abstain class is determined in response to at least bounding the input data, outputting a classification in response to the input data, and output a trained classifier configured to detect the additional abstain class in response to the input data classifier with a plurality of classes, including an additional abstain class.

According to a second embodiment, a system including a machine-learning network, comprising an input interface configured to receive input data from a sensor, wherein the sensor includes a camera, a radar, a sonar, or a microphone and a processor, in communication with the input interface. The processor is programmed to receiving an input data from a sensor, wherein the input data is indicative of image, radar, sonar, or sound information, train a classifier, wherein the classifier includes a plurality of classes, including an additional abstain class, wherein the abstain class is determined in response to at least bounding input data including one or more perturbations, and output a trained classifier configured to detect the additional abstain class in response to the input data.

According to a third embodiment, a computer-program product storing instructions which, when executed by a computer, cause the computer to receive input data from a sensor, wherein the sensor includes a camera, a radar, a sonar, or a microphone, wherein the input data is indicative of image, radar, sonar, or sound information, obtain a worst case bound on a classification error and loss associated with perturbed versions of the input data, utilizing at least bounding of one or more hidden layer values, in response to the input data, train a classifier of a machine-learning network, wherein the classifier includes a plurality of classes, including an additional abstain class, wherein the abstain class is determined in response to at least bounding input data including one or more perturbations, and output a trained classifier configured to detect the additional abstain class in response to the input data.

DETAILED DESCRIPTION

Figure 1:
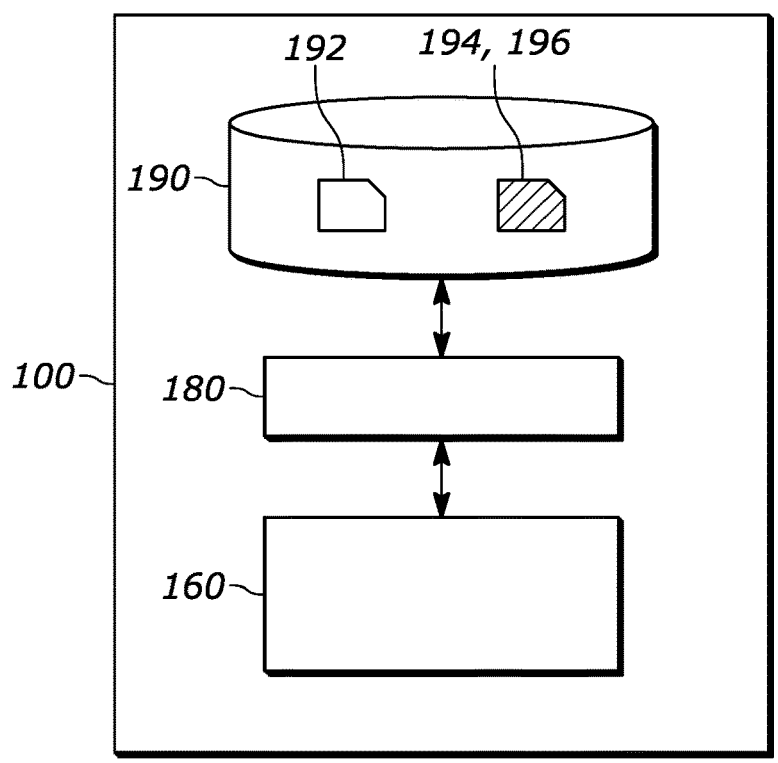
FIG. 1 shows a system 100 for training a neural network.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This disclosure concerns a method for training a neural network classification system with an abstain (rejection) option with provable robust (worst-case/adversarial) performance. The typical setup for an adversarial attack on a classifier, which we call C, is as follows: given an input x with true label y that is correctly classified by C (meaning, $C(x)=y$), the attacker aims to find a small (ideally human-imperceptible) perturbation $\delta$ such that $x+\delta$ is incorrectly classified by C (that is, $C(x+\delta) \neq y$). The proposed classifier has an additional class, called the abstain class (or the rejection/detection class), and the defense mechanism is designed such that it will either (1) classify adversarial perturbed inputs as the abstain/rejection/detection class, or (2) it will correctly classify it as the y class and thus prevents misclassification and fooling of the system.

There exists a large body of work in adversarial training of neural networks for classification (without rejection/abstain), where the classifier performance is robustified against such perturbations—these works lack provable performance guarantees.

A number of previous systems have proposed training procedures under which the resulting robustified classifier has provable performance, for example, an upper bound on the error rate (misclassification probability) for adversarial perturbed images subject to norm constraint on the perturbation.

In addition, in practice it is of interest to detect adversarially perturbed examples. However, all the available detection methods in the literature lack provable performance, and have been shown to fail detection if the attacker devises carefully crafted "adaptive perturbations" to simultaneously evade detection and cause misclassification.

The raised challenge in proper testing of—available detectors has made the need for detectors with provable performance imperative. A recent work proposes training a classifier with an extra class, for example, K+1 classes for a K-class classification task, where the extra class is referred to as the "abstain-class". By classifying an image in this class, the classifier is in fact abstaining from declaring the input as any of the other K-classes, and thus can be thought of as abstaining (or detecting or rejecting) the adversarial input. This work however has no provable performance guarantees, and its training process is different than the one proposed in this invention.

There exists no method for training a classifier with a detection/abstain option with provable robust performance in worst-case (or adversarial) settings. However, in this disclosure, the system may utilize for bound propagation and apply it to training classifiers with abstain/reject/detect option.

The disclosure below formulates a provable robust training procedure for neural networks for classification with a rejection class, in which models are trained to be provably robust to perturbations. To this end, the classifier is augmented with an extra class, resulting in a (K+1)-class classifier for a (K)-class classification task, and the adversarial perturbed inputs will be classified in this extra class, referred to as an abstain class, a detection class, or a rejection-class. Thus, fooling of the network and misclassification is mitigated by detection of the adversarial inputs.

The training process of this classifier is designed such that the classifier can provide guarantees on detection (abstaining) or correct-classification, thus together leading to failing of the attacker's objective, for a given input subject to a family of perturbations, such as norm constrained perturbations.

For training the aforementioned classifier, rather than minimizing the cross-entropy loss of the classifier, or optimally the robust cross entropy terms, the objective is first augmented with a term promoting classification of the adversarial inputs in the detection (abstain) class, and then the invention minimizes an upper bound of the worst-case loss of perturbed training samples (within a perturbation model) together with the traditional (robust) cross-entropy loss of the (clean) inputs. Thus, the increase in the cross-entropy of perturbed samples (attacks or not) is bounded, and the effect of the attack is mitigated.

Central to the invention is the robustness certificate that provides a lower bound for classifier output on the correct as well as the abstain class for any perturbed sample within a given family of perturbations, providing guarantees of "detection or correct-classification".

This disclosure enables detection of adversarial inputs by classifying them in the rejection class. Furthermore, it provides provable guarantees on the performance of the classifier by giving a certificate that all possible perturbations within a family of perturbations will be either detected or the perturbed image will be correctly-classified, thus guaranteeing unsuccessful attack by the adversary. This provides additional boost in performance guarantee achieved by other techniques without the detection capability.

This can also be used in detecting adversarial environments, and thus used for demanding manual control for safety-critical tasks by interpreting the detection of adversaries as unsafe/adversarial environment.

Also, abstaining from classification is sometimes interpreted as the classifier declaring its lack of certainty in the outcome of the classification task, and thus can be used for declaring high uncertainty.

FIG. 1 shows a system 100 for training a neural network. The system 100 may comprise an input interface for accessing training data 192 for the neural network. For example, as illustrated in FIG. 1, the input interface may be constituted by a data storage interface 180 which may access the training data 192 from a data storage 190. For example, the data storage interface 180 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 190 may be an internal data storage of the system 100, such as a hard drive or SSD, but also an external data storage, e.g., a network-accessible data storage.

In some embodiments, the data storage 190 may further comprise a data representation 194 of an untrained version of the neural network which may be accessed by the system 100 from the data storage 190. It will be appreciated, however, that the training data 192 and the data representation 194 of the untrained neural network may also each be accessed from a different data storage, e.g., via a different subsystem of the data storage interface 180. Each subsystem may be of a type as is described above for the data storage interface 180. In other embodiments, the data representation 194 of the untrained neural network may be internally generated by the system 100 on the basis of design parameters for the neural network, and therefore may not explicitly be stored on the data storage 190. The system 100 may further comprise a processor subsystem 160 which may be configured to, during operation of the system 100, provide an iterative function as a substitute for a stack of layers of the neural network to be trained. In one embodiment, respective layers of the stack of layers being substituted may have mutually shared weights and may receive, as input, an output of a previous layer, or for a first layer of the stack of layers, an initial activation, and a part of the input of the stack of layers. The system may also include multiple layers. The processor subsystem 160 may be further configured to iteratively train the neural network using the training data 192. Here, an iteration of the training by the processor subsystem 160 may comprise a forward propagation part and a backward propagation part. The processor subsystem 160 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 196 of the trained neural network, this data may also be referred to as trained model data 196. For example, as also illustrated in FIG. 1, the output interface may be constituted by the data storage interface 180, with said interface being in these embodiments an input/output ("IO") interface, via which the trained model data 196 may be stored in the data storage 190. For example, the data representation 194 defining the 'untrained' neural network may during or after the training be replaced, at least in part by the data representation 196 of the trained neural network, in that the parameters of the neural network, such as weights, hyperparameters and other types of parameters of neural networks, may be adapted to reflect the training on the training data 192. This is also illustrated in FIG. 1 by the reference numerals 194, 196 referring to the same data record on the data storage 190. In other embodiments, the data representation 196 may be stored separately from the data representation 194 defining the 'untrained' neural network. In some embodiments, the output interface may be separate from the data storage interface 180, but may in general be of a type as described above for the data storage interface 180.

Figure 2:
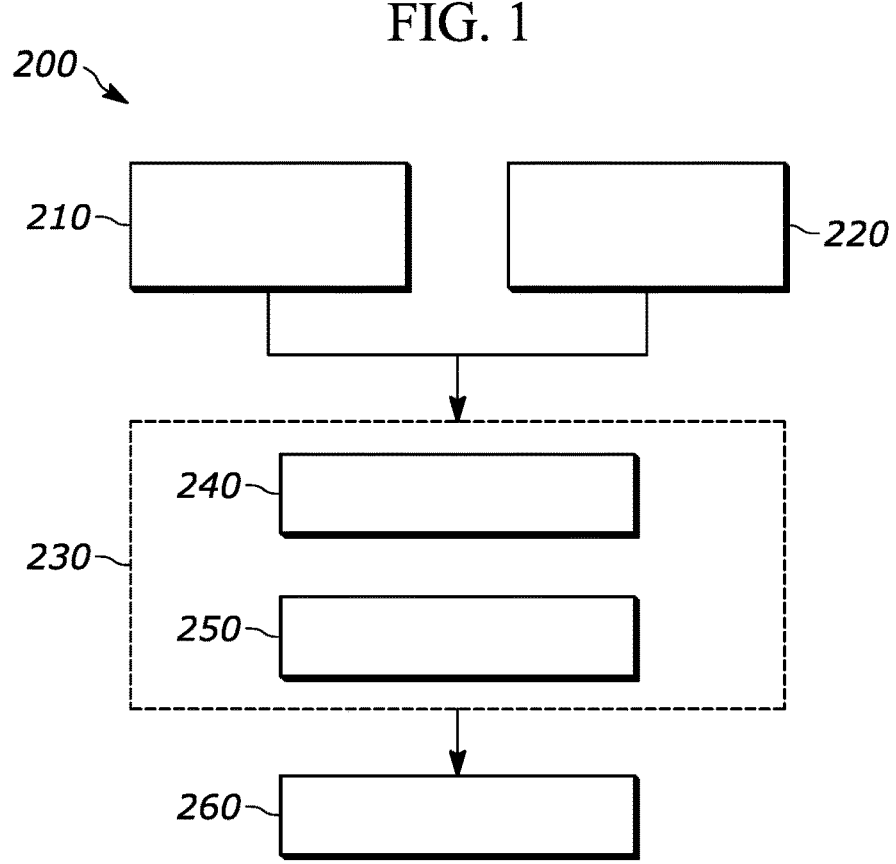
FIG. 2 shows a computer-implemented method 200 for training a neural network.

FIG. 2 shows a computer-implemented method 200 for training a neural network. The method 200 may correspond to an operation of the system 100 of FIG. 1, but does not need to, in that it may also correspond to an operation of another type of system, apparatus or device or in that it may correspond to a computer program.

The method 200 is shown to comprise, in a step titled "PROVIDING DATA REPRESENTATION OF NEURAL NETWORK", providing 210 a neural network, wherein the providing of the neural network comprises providing an iterative function as a substitute for a stack of layers of the neural network, wherein respective layers of the stack of layers being substituted have mutually shared weights and receive as input and output of a previous layer, or for a first layer of the stack of layers, an initial activation, and a part of the input of the stack of layers. The method 200 is further shown to comprise, in a step titled "ACCESSING TRAINING DATA", accessing 220 training data for the neural network. The method 200 is further shown to comprise, in a step titled "ITERATIVELY TRAINING NEURAL NETWORK USING TRAINING DATA", iteratively training 230 the neural network using the training data, which training 230 may comprise a forward propagation part and a backward propagation part. Performing the forward propagation part by the method 200 may comprise, in a step titled "DETERMINING EQUILIBRIUM POINT USING ROOT-FINDING ALGORITHM", determining 240 an equilibrium point of the iterative function at which the iterative function converges to a fixed point, wherein determining the equilibrium point comprises using a numerical root-finding algorithm to find a root solution for the iterative function minus its input, and in a step titled "PROVIDING EQUILIBRIUM POINT AS SUBSTITUTE FOR OUTPUT OF STACK OF LAYERS", providing 250 the equilibrium point as a substitute for an output of the stack of layers in the neural network. The method 200 may further comprise, after the training and in a step titled "OUTPUTTING TRAINED NEURAL NETWORK", outputting 260 a trained neural network. The Deep Equilibrium (DEQ) neural network may be further described in the Patent Application titled "DEEP NEURAL NETWORK WITH EQUILIBRIUM SOLVER," having application Ser. No. 16/985,852, filed Aug. 5, 2020, which is herein incorporated by reference in its entirety.

Figure 3:
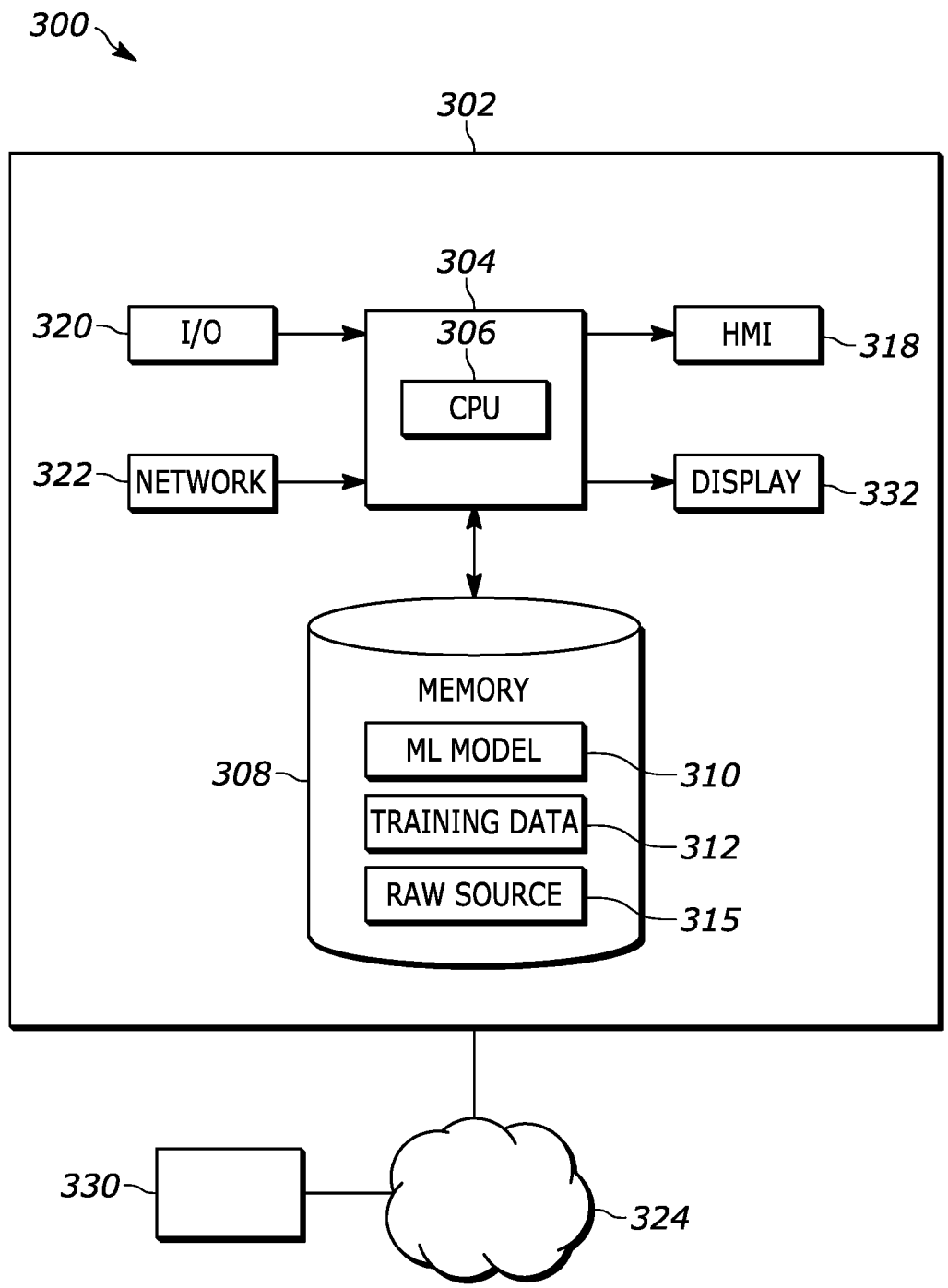
FIG. 3 depicts a data annotation system 300 to implement a system for annotating data.

FIG. 3 depicts a data annotation system 300 to implement a system for annotating data. The data annotation system 300 may include at least one computing system 302. The computing system 302 may include at least one processor 304 that is operatively connected to a memory unit 308. The processor 304 may include one or more integrated circuits that implement the functionality of a central processing unit (CPU) 306. The CPU 306 may be a commercially available processing unit that implements an instruction stet such as one of the x86, ARM, Power, or MIPS instruction set families. During operation, the CPU 306 may execute stored program instructions that are retrieved from the memory unit 308. The stored program instructions may include software that controls operation of the CPU 306 to perform the operation described herein. In some examples, the processor 304 may be a system on a chip (SoC) that integrates functionality of the CPU 306, the memory unit 308, a network interface, and input/output interfaces into a single integrated device. The computing system 302 may implement an operating system for managing various aspects of the operation.

The memory unit 308 may include volatile memory and non-volatile memory for storing instructions and data. The non-volatile memory may include solid-state memories, such as NAND flash memory, magnetic and optical storage media, or any other suitable data storage device that retains data when the computing system 302 is deactivated or loses electrical power. The volatile memory may include static and dynamic random-access memory (RAM) that stores program instructions and data. For example, the memory unit 308 may store a machine-learning model 310 or algorithm, a training dataset 312 for the machine-learning model 310, raw source dataset 315.

The computing system 302 may include a network interface device 322 that is configured to provide communication with external systems and devices. For example, the network interface device 322 may include a wired and/or wireless Ethernet interface as defined by Institute of Electrical and Electronics Engineers (IEEE) 802.11 family of standards. The network interface device 322 may include a cellular communication interface for communicating with a cellular network (e.g., 3G, 4G, 5G). The network interface device 322 may be further configured to provide a communication interface to an external network 324 or cloud.

The external network 324 may be referred to as the world-wide web or the Internet. The external network 324 may establish a standard communication protocol between computing devices. The external network 324 may allow information and data to be easily exchanged between computing devices and networks. One or more servers 330 may be in communication with the external network 324.

The computing system 302 may include an input/output (I/O) interface 320 that may be configured to provide digital and/or analog inputs and outputs. The I/O interface 320 may include additional serial interfaces for communicating with external devices (e.g., Universal Serial Bus (USB) interface).

The computing system 302 may include a human-machine interface (HMI) device 318 that may include any device that enables the system 300 to receive control input. Examples of input devices may include human interface inputs such as keyboards, mice, touchscreens, voice input devices, and other similar devices. The computing system 302 may include a display device 332. The computing system 302 may include hardware and software for outputting graphics and text information to the display device 332. The display device 332 may include an electronic display screen, projector, printer or other suitable device for displaying information to a user or operator. The computing system 302 may be further configured to allow interaction with remote HMI and remote display devices via the network interface device 322.

The system 300 may be implemented using one or multiple computing systems. While the example depicts a single computing system 302 that implements all of the described features, it is intended that various features and functions may be separated and implemented by multiple computing units in communication with one another. The particular system architecture selected may depend on a variety of factors.

The system 300 may implement a machine-learning algorithm 310 that is configured to analyze the raw source dataset 315. The raw source dataset 315 may include raw or unprocessed sensor data that may be representative of an input dataset for a machine-learning system. The raw source dataset 315 may include video, video segments, images, text-based information, and raw or partially processed sensor data (e.g., radar map of objects). In some examples, the machine-learning algorithm 310 may be a neural network algorithm that is designed to perform a predetermined function. For example, the neural network algorithm may be configured in automotive applications to identify pedestrians in video images.

The computer system 300 may store a training dataset 312 for the machine-learning algorithm 310. The training dataset 312 may represent a set of previously constructed data for training the machine-learning algorithm 310. The training dataset 312 may be used by the machine-learning algorithm 310 to learn weighting factors associated with a neural network algorithm. The training dataset 312 may include a set of source data that has corresponding outcomes or results that the machine-learning algorithm 310 tries to duplicate via the learning process. In this example, the training dataset 312 may include source videos with and without pedestrians and corresponding presence and location information. The source videos may include various scenarios in which pedestrians are identified.

The machine-learning algorithm 310 may be operated in a learning mode using the training dataset 312 as input. The machine-learning algorithm 310 may be executed over a number of iterations using the data from the training dataset 312. With each iteration, the machine-learning algorithm 310 may update internal weighting factors based on the achieved results. For example, the machine-learning algorithm 310 can compare output results (e.g., annotations) with those included in the training dataset 312. Since the training dataset 312 includes the expected results, the machine-learning algorithm 310 can determine when performance is acceptable. After the machine-learning algorithm 310 achieves a predetermined performance level (e.g., 100% agreement with the outcomes associated with the training dataset 312), the machine-learning algorithm 310 may be executed using data that is not in the training dataset 312. The trained machine-learning algorithm 310 may be applied to new datasets to generate annotated data.

The machine-learning algorithm 310 may be configured to identify a particular feature in the raw source data 315. The raw source data 315 may include a plurality of instances or input dataset for which annotation results are desired. For example, the machine-learning algorithm 310 may be configured to identify the presence of a pedestrian in video images and annotate the occurrences. The machine-learning algorithm 310 may be programmed to process the raw source data 315 to identify the presence of the particular features. The machine-learning algorithm 310 may be configured to identify a feature in the raw source data 315 as a predetermined feature (e.g., pedestrian). The raw source data 315 may be derived from a variety of sources. For example, the raw source data 315 may be actual input data collected by a machine-learning system. The raw source data 315 may be machine generated for testing the system. As an example, the raw source data 315 may include raw video images from a camera.

In the example, the machine-learning algorithm 310 may process raw source data 315 and output an indication of a representation of an image. The output may also include augmented representation of the image. A machine-learning algorithm 310 may generate a confidence level or factor for each output generated. For example, a confidence value that exceeds a predetermined high-confidence threshold may indicate that the machine-learning algorithm 310 is confident that the identified feature corresponds to the particular feature. A confidence value that is less than a low-confidence threshold may indicate that the machine-learning algorithm 310 has some uncertainty that the particular feature is present.

Figure 4:
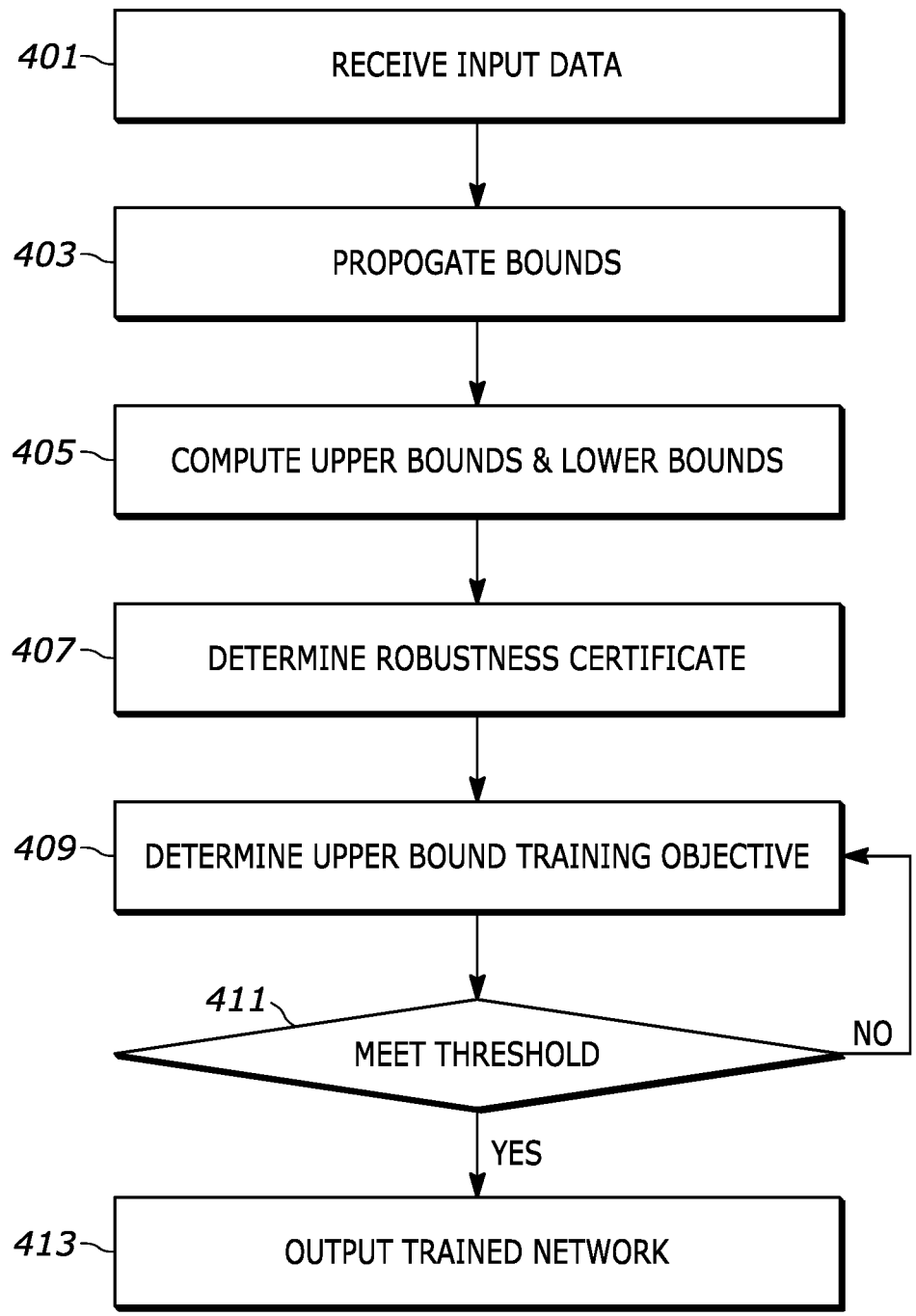
FIG. 4 is an exemplary flow chart of a system training a neural network with robust classification of adversarial examples.

FIG. 4 is an exemplary flow chart of a system training a neural network with robust classification of adversarial examples. In one example, θ may denote the parameters of the classifier model, and (x,y)~D the data used to train the model. Under traditional classifier objective, that is with no abstain class and no robustness guarantee, the model is trained by minimizing the cross-entropy objective $$\min_{\theta} \mathbb{E}_{(x,y) \sim D} \ell_{xent}(f_\theta(x), y) \equiv \min_{\theta} \sum_{(x,y) \sim D} \ell_{xent}(f_\theta(x), y)$$

In order to provide guarantees on the robustness against a class of perturbations subject to a norm constrain, e.g., $\|\delta\|_p \leq \epsilon$ for p=0, 1, 2, ∞, the common way in the literature is to solve the following certificate problem:

$$p_i^* = \min_{z \in \hat{Z}_L} c_i^T z \quad \forall i \neq y$$

where $c_i = e_y - e_i$ for the $e_i$ is the canonical vector of size K (equal to the total number of classes) with entry 1 at the i-th location and zero elsewhere, and similarly for $e_y$ with y denoting the correct class. Furthermore, $\hat{Z} = \{z_L | \underline{z_L} < z_L \leq \overline{z_L}\}$, denotes the feasible-set for the hidden layer values of the last layer of the neural networks. The upper and lower bounds of the feasible set is obtained by propagating the upper and lower bounds on the perturbed input bounded by the adversarial norm constraint $\|\delta\|_p \leq \epsilon$, done via various techniques, such as interval bound propagation (IBP) and CROWN.

If for a given test data (x,y), the aforementioned problem has the optimal solution $p_i^* \geq 0$ for $\forall i \neq y$, then it is guaranteed that no perturbation within the class of $\|\delta\|_p \leq \epsilon$ can cause the input image (x+δ,y) to be misclassified.

To tighten the bound, for a network with L-Layers, the system may use the bounds on the layer (L−1) and use the explicit transformation of the last layer for mapping $z_{L-1}$ into $z_L$, rendering the certification subproblem:

$$p_i^* = \min_{z \in \widehat{Z}_{L-1}} C_i^T W_L z \quad \forall \, i \neq y$$

with $W_L$ denoting the affine transformation of the last layer of the neural network.

In order for the aforementioned problem to provide certification of robustness for a high number of input images, the training process is altered accordingly, such that the trained network is robust.

This can be accommodated by bounding the training objective (e.g., training objective function) by its worst-case upper bound via the interval bound propagation technique as $$\min_\theta \sum_{(x_i, y) \sim D} \ell_{xent}(f_\theta(x), y) \leq \min_\theta \sum_{(x,y) \sim D} \ell_{xent}(-m_{IBP}, y)$$

Or more generally, $$\min_\theta \sum_{(x,y) \sim D} \ell_{xent}(f_\theta(x), y) \leq \min_\theta \sum_{(x,y) \sim D} \ell_{xent}(-\alpha m_{IBP} - (1-\alpha) m_{crown}, y)$$

where $0 \leq \alpha \leq 1$ provides a convex combination of vectors $m_{IBP}$ and $m_{crown}$ as input to the cross-entropy loss, and the i-th entry of the vectors $m_{IBP}$ and $m_{crown}$ are given by $p_i^*$ for $\forall i \neq y$ for the certification subproblems given by bounds provided via IBM or CROWN methods, respectively.

In order to have more stable training, the system may use a combination of regular and robust loss functions for training, namely $$\min_\theta \sum_{(x,y) \sim D} (\kappa_1 \ell_{xent}(-\alpha m_{IBP}(x) - (1-\alpha) m_{crown}(x), y) + \kappa_2 \ell_{xent}(f_\theta(x), y))$$

Thus, the coefficient $0 \leq \kappa \leq 1$ may trade performance on clean images for robustness on adversarial perturbed images.

The system described, the robust classifier may be augmented with an abstain class, detection class, or rejection class (which may be utilized to describe a special class individually, or all collectively). The examples classified in the abstain class will be interpreted as adversarial. Thus, the system may detect the adversarial images and the classifier rejects further assigning these inputs into any of the regular classes.

The upper bounds and lower bounds may define a bounding box that may be utilized to predict an object location. Thus, an object detection system may draw a bounding box around each object of interest in an image or input data, and assign each bounding box a class label. Each perturbation of the image or input may be bounded (limited) to a certain distortion power. The system may model bounding each pixel in an input image to be changed by a maximum perturbation size.

At step 401, the system may receive an input data. The input data may be an image, sound, video, sonar/radar/Lidar data, etc. The input data may be retrieved from one or more sensors, such as a camera, microphone, Lidar sensor, radar sensor, sonar sensor, or any other input sensor. Certification in such a system may amount to guaranteeing that for a test data (x,y), all possible perturbations of input (x+δ,y) within the class of $\|\delta\|_p \leq \epsilon$ will be either correctly classified or detected. Thus, if the solution to the following problem is positive, e.g., $p_i^* \geq 0$ for $\forall i \neq y$, where $$p_i^* = \min_{z \in \widehat{Z}_L} \max\{C_{y,i}^T z, C_{a,i}^T z\} \quad \forall \, i \neq y$$

where $c_{y,i} = e_y - e_i$ for the $e_i$ is the canonical vector of size K+1 (equal to the total number of classes (K) plus the abstain/detection class) with entry 1 at the i-th location and zero elsewhere, and similarly $c_{\alpha,i} = e_\alpha - e_i$ with $\alpha$ indexing the abstain class.

This optimization can be lower-bounded via the corresponding dual optimization as $$p_i^* \geq \widehat{p_i^*} := \max_{0 \leq \eta_i \leq 1} \min_{z \in \widehat{Z}_L} \eta_i C_{y,i}^T z + (1-\eta_i) C_{a,i}^T z \quad \forall \, i \neq y \quad (\text{P1})$$

Upper and lower bounds of the feasible set $\widehat{Z}_L$ in the optimization can be determined by the system utilizing IBP or CROWN or any other similar techniques to establish upper and lower bounds.

Consequently, the training process may accommodate the certification optimization objective, rendering the training of the network as minimization of the loss function:

$$\min_\theta \sum_{(x,y) \sim D} \left( \kappa_1 \mathcal{L}_{regular}(x_i, \theta) + \kappa_2 \mathcal{L}_{robust}(x_i, \theta) + \kappa_3 \mathcal{L}_{robust}^{abstain}(x_i, \theta) \right)$$

$$\mathcal{L}_{regular}(x_i, \theta) := \ell_{xent}(x, y)$$

and $$\mathcal{L}_{robust}(x_i, \theta) := \ell_{xent}(v_{robust}, y)$$

with $$v_{robust} = -\alpha m_{IBP}^{abstain}(x; [\eta_k, \ldots, \eta_K]) - $$
$$1(1-\alpha)\, m_{crown}^{abstain}(x; [\eta_1, \ldots, \eta_K])\,|_{[\eta_1, \ldots, \eta_K] = [1,1,\ldots,1]}$$

and $$\mathcal{L}_{robust}^{abstain}(x_i, \theta) := \ell_{xent}(v_{robust}^{abstain}, y)$$

with $$v_{robust} = -\alpha\, m_{IBP}^{abstain}(x; [\eta_1, \ldots, \eta_K]) - $$
$$(1-\alpha)\, m_{crown}^{abstain}(x; [\eta_1, \ldots, \eta_K])\,|_{[\eta_1, \ldots, \eta_K] = [\hat\eta_1, \ldots, \hat\eta_K]}$$

where $[\hat\eta_1, \ldots, \hat\eta_K]$ are obtained by solving the optimization in (P1; e.g. lower-bounded dual optimization).

Overall, the system described in the disclosure trains the classifier and provides certification, as explained below. The system may receive an input data that is utilized for training. The system may train the classifier upon exceeding a convergence threshold.

Thus, the input may include:

training data $\mathcal{X} = \{(x_1, y_1), \ldots, (x_n, y_n)\}$, $x_i \in \mathbb{R}^M$ and $y_i \in \{1, 2, \ldots, K\}$, training robustness value $\in_{train}$ FOR $x \in \mathcal{X}$ At step 403, the system may propagate bounds to compute a robustness certificate. The system may consider a classifier parameterized with network parameters θ and (K+1) outputs where K of them correspond to the original classes in the data, and one corresponds to the abstain/rejection/detection class:

Compute upper $\bar{x}$ and lower $\underline{x}$ bounds on input x $$\bar{x} = (x + \epsilon_{train} 1); \underline{x} = (x - \epsilon_{train} 1)$$

At step 405, the system may compute upper and lower bound of the hidden values of the network. The system may compute upper and lower bound of the hidden values of the network at layer L−1, as shown in the formula below:

$$\underline{z}_{L-1} = \min\{\underline{z}_{L-1}(x), \underline{z}_{L-1}(\bar{x})\}, \overline{z_{L-1}} = \max\{\overline{z_{L-1}}(\underline{x}), \overline{z_{L-1}}(\bar{x})\}$$

At step 407, the system may determine or operate a robustness certificate. The system may calculate various parameters to ensure robustness. The system may compute $\eta_i$ for $\forall i \neq y, \alpha$ $$p_i^* \geq \widehat{p_i^*} := \max_{0 \leq \eta_i \leq 1} \min_{z \in \hat{Z}_L} \eta_i C_{y,i}^T z + (1 - \eta_i) C_{a,i}^T z \quad \forall i \neq y, a \tag{P1}$$

If $\widehat{p_i^*} \geq 0$ for all $\forall i \neq y, \alpha$, then robustness of the classifier for sample (x,y) may be guaranteed.

At step 409, the system may compute an upper bound of a training objective. The system may compute the upper bound of training objective utilizing the following:

$$\mathcal{L}_{regular}(x_i, \theta) := \ell_{xent}(x, y)$$

$$\mathcal{L}_{robust}(x_i, \theta) := \ell_{xent}(v_{robust}, y) \text{ with}$$

$$v_{robust} =$$

$$-\alpha m_{IBP}^{abstain}(x; [\eta, ..., \eta_K]) - (1-\alpha) m_{crown}^{abstain}(x; [\eta_1, ..., \eta_K])|_{[\eta_1,...,\eta_K]=[1,1,...,1]}$$

where for the ($\forall i \neq y, a$) entry $$\left[m_{IBP}^{abstain}(x; [\eta_1, ..., \eta_K])\right]_i = \min_{z \in \widehat{Z_{L-IBP}}} \eta_i C_{y,i}^T z + (1 - \eta_i) C_{a,i}^T z$$

and $\left[m_{CROWN}^{abstain}(x; [\eta_1, ..., \eta_K])\right]_i = \min_{z \in \widehat{Z \text{ CROWN}}} \eta_i C_{y,i}^T z + (1 - \eta_i) C_{a,i}^T z$ and for $i = y \left[m_{IBP}^{abstain}(x; [\eta_1, ..., \eta_K])\right]_i = \left[m_{CROWN}^{abstain}(x; [\eta_1, ..., \eta_K])\right]_i = 0$ $$\mathcal{L}_{robust}^{abstain}(x_i, \theta) : \ell_{xent}(v_{robust}^{abstain}, y) \text{ with}$$

$$v_{robust} = -\alpha m_{IBP}^{abstain}(x; [\eta_1, ..., \eta_K]) -$$

$$(1-\alpha) m_{crown}^{abstain}(x; [\eta_1, ..., \eta_K])|_{[\eta_1,...,\eta_K]=[\hat{\eta}_1,...,\hat{\eta}_K]}$$

where $[\hat{\eta}_1, \ldots, \hat{\eta}_K]$ are obtained by solving the optimization in (P1).

Finally obtain $$\mathcal{L}_{\overline{(x_i, \theta)}} = \kappa_1 \mathcal{L}_{regular}(x_i, \theta) + \kappa_2 \mathcal{L}_{robust}(x_i, \theta) + \kappa_3 \mathcal{L}_{robust}^{abstain}(x_i, \theta)$$

The system may also optimize the robustness certificate and classifier. For example, the update network parameters to improve robustness and its certificate:

$$\theta \leftarrow \theta - \eta \nabla \mathcal{L}_{\overline{(x_i, \theta)}}$$

The system may then output such information. The system may receive an input data that is utilized for training. The system may train the classifier upon exceeding a convergence threshold. At decision 411, the system may determine if the network has met a convergence threshold. If the system has not met the convergence threshold, it will continue to train the network. However, if convergence is met, the system will output the trained network. At step 413, the output may be a trained network. Thus, the robustly trained (K+1)-class classifier may be configured to enable a detection/rejection/abstain class with parameters θ.

The system may also work on a robustness certificate. During a test phase, for test pair (x,y) problem (P1) is solved and if $\widehat{p_i^*} \geq 0$, then robustness is guaranteed in terms of guaranteeing that misclassification will not occur as either correct classification or successful detection is guaranteed for all perturbations (x+δ) within the class of $\|\delta\|_p \leq \epsilon$.

In another embodiment, the system may utilize interval bound propagation (IBP) to compute the output bounds, and can be using any methods, such as CROWN or any other IBP methods (e.g., Tensor Flow) and CROWN.

Parameters $[\eta_1, \ldots, \eta_K]$ can be obtained by solving the certificate subproblem for each of these techniques separately, and any choice of $0 \leq \alpha \leq 1$ (alpha is the convex combination coefficients) may give a valid bound. CROWN bounds may be better approximated during the initial steps of the training phase, and IBP bounds are tighter bounds in later stages of the training, thus $\alpha_{initial}=0$ and $\alpha_{final}=1$ with linear (or nonlinear) interpolation in-between is a practical choice. But the system may determine that generally all choices of $0 \leq \alpha \leq 1$ are valid.

All choices of $0 \leq \eta_i \leq 1$ may be considered valid. Utilizing $\eta_i=1$ may reduce the certification process to the case where there is no abstain, (or detect, or reject) capability for the classifier, e.g., previous works of IBP and CROWN. Choice of $\eta_i=0$ may be a more stringent choice for a classifier with rejection and can be applied to reduce complexity of solving the lower-bounded via the corresponding dual optimization (equation P1) per samples. However, it may reduce complexity. Thus $\eta_i=0$ can be used during the training process for faster and less complex training process, and optimal value of $\eta_i$ for the certificate subproblem may be determined during the test phase for a tighter certificate or more accurate certificate. In yet another embodiment, for better generalization, one embodiment of a system can restrain the feasible set of $0 \leq \eta_i \leq 1$ to $0 < \underline{\eta} \leq \eta_i \leq \bar{\eta} < 1$ during the training process.

Figure 5:
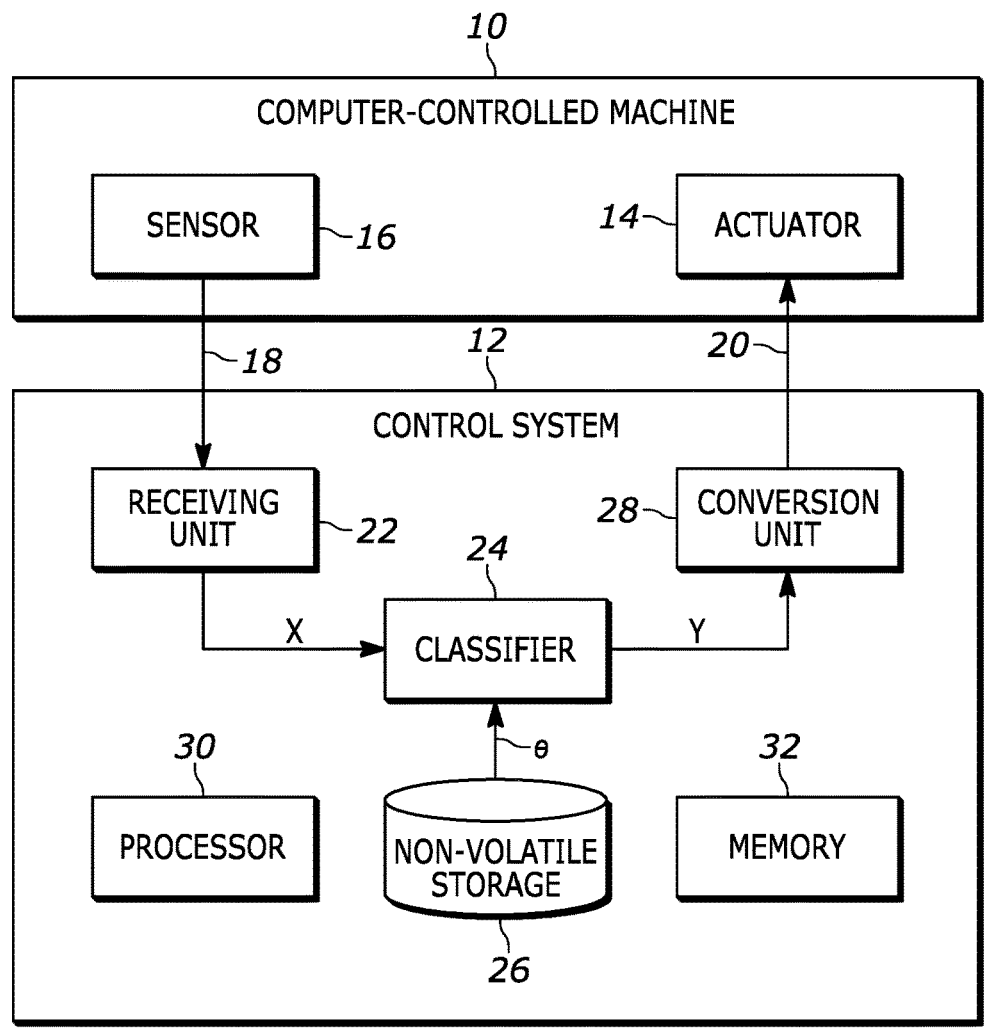
FIG. 5 depicts a schematic diagram of an interaction between computer-controlled machine 10 and control system 12.

FIG. 5 depicts a schematic diagram of an interaction between computer-controlled machine 10 and control system 12. The computer-controlled machine 10 may include a neural network as described in FIGS. 1-4. The computer-controlled machine 10 includes actuator 14 and sensor 16. Actuator 14 may include one or more actuators and sensor 16 may include one or more sensors. Sensor 16 is configured to sense a condition of computer-controlled machine 10. Sensor 16 may be configured to encode the sensed condition into sensor signals 18 and to transmit sensor signals 18 to control system 12. Non-limiting examples of sensor 16 include video, radar, LiDAR, ultrasonic and motion sensors. In one embodiment, sensor 16 is an optical sensor configured to sense optical images of an environment proximate to computer-controlled machine 10.

Control system 12 is configured to receive sensor signals 18 from computer-controlled machine 10. As set forth below, control system 12 may be further configured to compute actuator control commands 20 depending on the sensor signals and to transmit actuator control commands 20 to actuator 14 of computer-controlled machine 10.

As shown in FIG. 5, control system 12 includes receiving unit 22. Receiving unit 22 may be configured to receive sensor signals 18 from sensor 16 and to transform sensor signals 18 into input signals x. In an alternative embodiment, sensor signals 18 are received directly as input signals x without receiving unit 22. Each input signal x may be a portion of each sensor signal 18. Receiving unit 22 may be configured to process each sensor signal 18 to product each input signal x. Input signal x may include data corresponding to an image recorded by sensor 16.

Control system 12 includes classifier 24. Classifier 24 may be configured to classify input signals x into one or more labels using a machine learning (ML) algorithm, such as a neural network described above. Classifier 24 is configured to be parametrized by parameters, such as those described above (e.g., parameter θ). Parameters θ may be stored in and provided by non-volatile storage 26. Classifier 24 is configured to determine output signals y from input signals x. Each output signal y includes information that assigns one or more labels to each input signal x. Classifier 24 may transmit output signals y to conversion unit 28. Conversion unit 28 is configured to covert output signals y into actuator control commands 20. Control system 12 is configured to transmit actuator control commands 20 to actuator 14, which is configured to actuate computer-controlled machine 10 in response to actuator control commands 20. In another embodiment, actuator 14 is configured to actuate computer-controlled machine 10 based directly on output signals y.

Upon receipt of actuator control commands 20 by actuator 14, actuator 14 is configured to execute an action corresponding to the related actuator control command 20. Actuator 14 may include a control logic configured to transform actuator control commands 20 into a second actuator control command, which is utilized to control actuator 14. In one or more embodiments, actuator control commands 20 may be utilized to control a display instead of or in addition to an actuator.

In another embodiment, control system 12 includes sensor 16 instead of or in addition to computer-controlled machine 10 including sensor 16. Control system 12 may also include actuator 14 instead of or in addition to computer-controlled machine 10 including actuator 14.

As shown in FIG. 5, control system 12 also includes processor 30 and memory 32. Processor 30 may include one or more processors. Memory 32 may include one or more memory devices. The classifier 24 (e.g., ML algorithms) of one or more embodiments may be implemented by control system 12, which includes non-volatile storage 26, processor 30 and memory 32.

Non-volatile storage 26 may include one or more persistent data storage devices such as a hard drive, optical drive, tape drive, non-volatile solid-state device, cloud storage or any other device capable of persistently storing information. Processor 30 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 32. Memory 32 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 30 may be configured to read into memory 32 and execute computer-executable instructions residing in non-volatile storage 26 and embodying one or more ML algorithms and/or methodologies of one or more embodiments. Non-volatile storage 26 may include one or more operating systems and applications. Non-volatile storage 26 may store compiled and/or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

Upon execution by processor 30, the computer-executable instructions of non-volatile storage 26 may cause control system 12 to implement one or more of the ML algorithms and/or methodologies as disclosed herein. Non-volatile storage 26 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments. The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
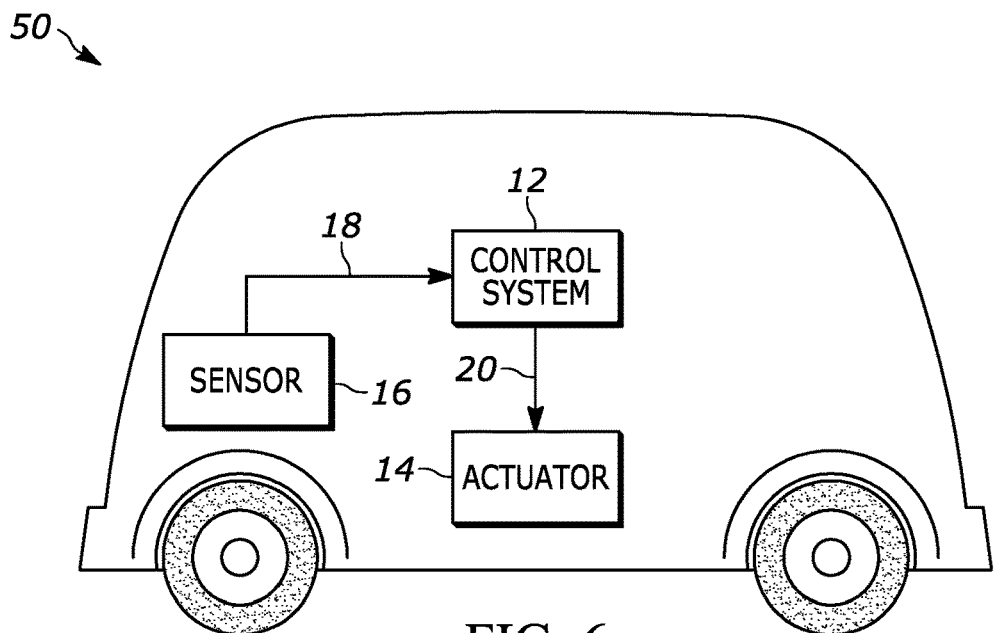
FIG. 6 depicts a schematic diagram of the control system of FIG. 1 configured to control a vehicle, which may be a partially autonomous vehicle or a partially autonomous robot.

FIG. 6 depicts a schematic diagram of control system 12 configured to control vehicle 50, which may be an at least partially autonomous vehicle or an at least partially autonomous robot. As shown in FIG. 5, vehicle 50 includes actuator 14 and sensor 16. Sensor 16 may include one or more video sensors, radar sensors, ultrasonic sensors, LiDAR sensors, and/or position sensors (e.g. GPS). One or more of the one or more specific sensors may be integrated into vehicle 50. Alternatively, or in addition to one or more specific sensors identified above, sensor 16 may include a software module configured to, upon execution, determine a state of actuator 14. One non-limiting example of a software module includes a weather information software module configured to determine a present or future state of the weather proximate vehicle 50 or other location.

Classifier 24 of control system 12 of vehicle 50 may be configured to detect objects in the vicinity of vehicle 50 dependent on input signals x. In such an embodiment, output signal y may include information characterizing the vicinity of objects to vehicle 50. Actuator control command 20 may be determined in accordance with this information. The actuator control command 20 may be used to avoid collisions with the detected objects.

In embodiments where vehicle 50 is an at least partially autonomous vehicle, actuator 14 may be embodied in a brake, a propulsion system, an engine, a drivetrain, or a steering of vehicle 50. Actuator control commands 20 may be determined such that actuator 14 is controlled such that vehicle 50 avoids collisions with detected objects. Detected objects may also be classified according to what classifier 24 deems them most likely to be, such as pedestrians or trees. The actuator control commands 20 may be determined depending on the classification. The control system 12 may utilize joint adversarial training to help train the classifier and generator for adversarial conditions, such as during poor lighting conditions or poor weather conditions of the vehicle environment.

In other embodiments where vehicle 50 is an at least partially autonomous robot, vehicle 50 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 20 may be determined such that a propulsion unit, steering unit and/or brake unit of the mobile robot may be controlled such that the mobile robot may avoid collisions with identified objects.

In another embodiment, vehicle 50 is an at least partially autonomous robot in the form of a gardening robot. In such embodiment, vehicle 50 may use an optical sensor as sensor 16 to determine a state of plants in an environment proximate vehicle 50. Actuator 14 may be a nozzle configured to spray chemicals. Depending on an identified species and/or an identified state of the plants, actuator control command 20 may be determined to cause actuator 14 to spray the plants with a suitable quantity of suitable chemicals.

Vehicle 50 may be an at least partially autonomous robot in the form of a domestic appliance. Non-limiting examples of domestic appliances include a washing machine, a stove, an oven, a microwave, or a dishwasher. In such a vehicle 50, sensor 16 may be an optical sensor configured to detect a state of an object which is to undergo processing by the household appliance. For example, in the case of the domestic appliance being a washing machine, sensor 16 may detect a state of the laundry inside the washing machine. Actuator control command 20 may be determined based on the detected state of the laundry.

Figure 7:
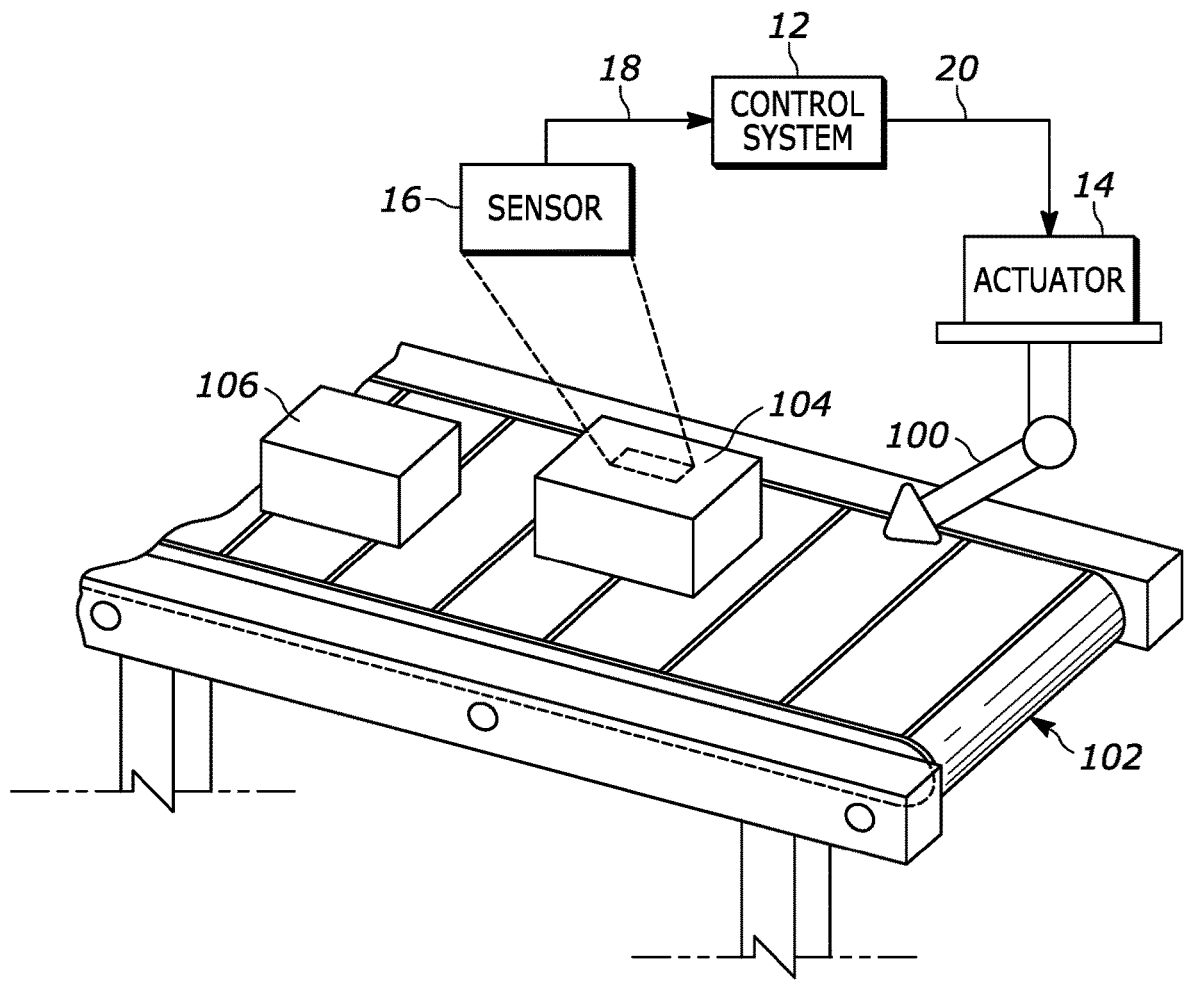
FIG. 7 depicts a schematic diagram of the control system of FIG. 1 configured to control a manufacturing machine, such as a punch cutter, a cutter or a gun drill, of manufacturing system, such as part of a production line.

FIG. 7 depicts a schematic diagram of control system 12 configured to control system 100 (e.g., manufacturing machine), such as a punch cutter, a cutter or a gun drill, of manufacturing system 102, such as part of a production line. Control system 12 may be configured to control actuator 14, which is configured to control system 100 (e.g., manufacturing machine).

Sensor 16 of system 100 (e.g., manufacturing machine) may be an optical sensor configured to capture one or more properties of manufactured product 104. Classifier 24 may be configured to determine a state of manufactured product 104 from one or more of the captured properties. Actuator 14 may be configured to control system 100 (e.g., manufacturing machine) depending on the determined state of manufactured product 104 for a subsequent manufacturing step of manufactured product 104. The actuator 14 may be configured to control functions of system 100 (e.g., manufacturing machine) on subsequent manufactured product 106 of system 100 (e.g., manufacturing machine) depending on the determined state of manufactured product 104. The control system 12 may utilize joint adversarial training to help train the classifier and generator for adversarial conditions, such as during poor lighting conditions or working conditions difficult for the sensors to identify conditions, such as lots of dust.

Figure 8:
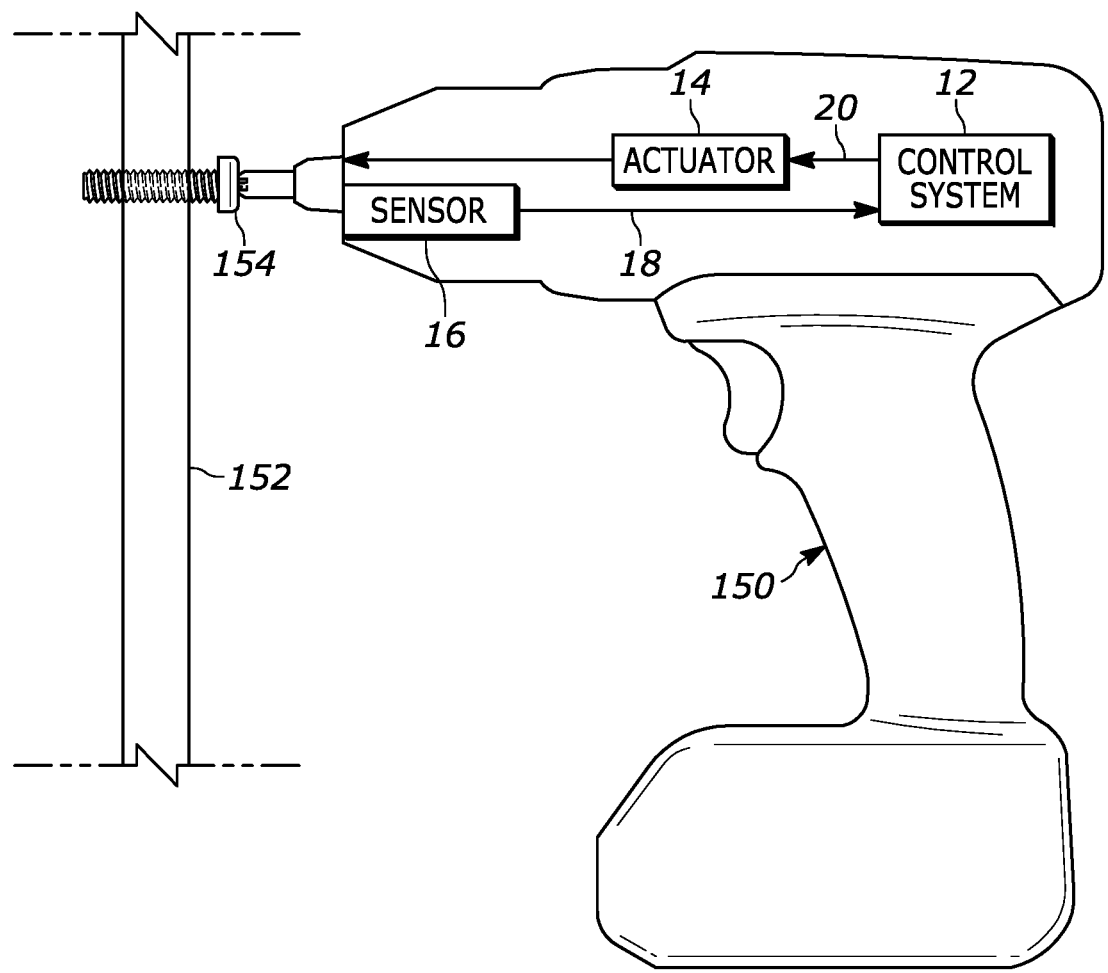
FIG. 8 depicts a schematic diagram of the control system of FIG. 1 configured to control a power tool, such as a power drill or driver, that has an at least partially autonomous mode.

FIG. 8 depicts a schematic diagram of control system 12 configured to control power tool 150, such as a power drill or driver, that has an at least partially autonomous mode. Control system 12 may be configured to control actuator 14, which is configured to control power tool 150.

Sensor 16 of power tool 150 may be an optical sensor configured to capture one or more properties of work surface 152 and/or fastener 154 being driven into work surface 152. Classifier 24 may be configured to determine a state of work surface 152 and/or fastener 154 relative to work surface 152 from one or more of the captured properties. The state may be fastener 154 being flush with work surface 152. The state may alternatively be hardness of work surface 152. Actuator 14 may be configured to control power tool 150 such that the driving function of power tool 150 is adjusted depending on the determined state of fastener 154 relative to work surface 152 or one or more captured properties of work surface 152. For example, actuator 14 may discontinue the driving function if the state of fastener 154 is flush relative to work surface 152. As another non-limiting example, actuator 14 may apply additional or less torque depending on the hardness of work surface 152. The control system 12 may utilize joint adversarial training to help train the classifier and generator for adversarial conditions, such as during poor lighting conditions or poor weather conditions. Thus, the control system 12 may be able to identify environment conditions of the power tool 150.

Figure 9:
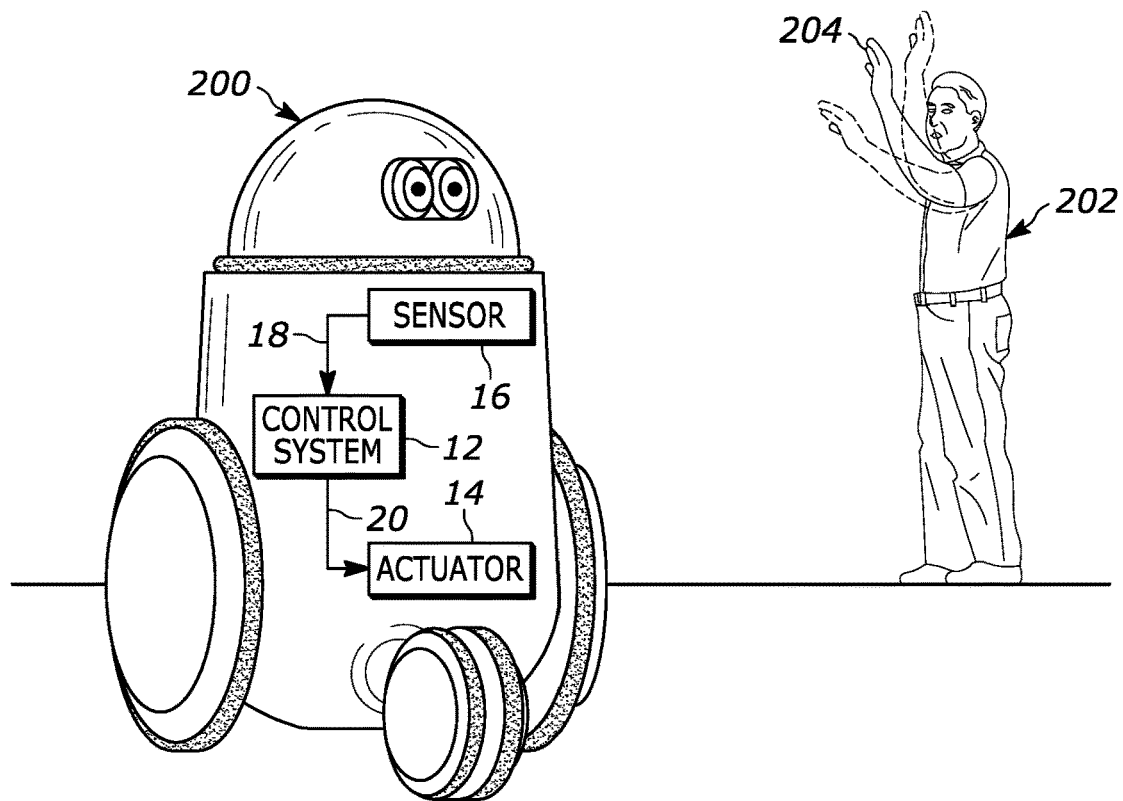
FIG. 9 depicts a schematic diagram of the control system of FIG. 1 configured to control an automated personal assistant.

FIG. 9 depicts a schematic diagram of control system 12 configured to control automated personal assistant 900. Control system 12 may be configured to control actuator 14, which is configured to control automated personal assistant 900. Automated personal assistant 900 may be configured to control a domestic appliance, such as a washing machine, a stove, an oven, a microwave or a dishwasher.

Sensor 16 may be an optical sensor and/or an audio sensor. The optical sensor may be configured to receive video images of gestures 904 of user 902. The audio sensor may be configured to receive a voice command of user 902.

Control system 12 of automated personal assistant 900 may be configured to determine actuator control commands 20 configured to control system 12. Control system 12 may be configured to determine actuator control commands 20 in accordance with sensor signals 18 of sensor 16. Automated personal assistant 900 is configured to transmit sensor signals 18 to control system 12. Classifier 24 of control system 12 may be configured to execute a gesture recognition algorithm to identify gesture 904 made by user 902, to determine actuator control commands 20, and to transmit the actuator control commands 20 to actuator 14. Classifier 24 may be configured to retrieve information from non-volatile storage in response to gesture 904 and to output the retrieved information in a form suitable for reception by user 902. The control system 12 may utilize joint adversarial training to help train the classifier and generator for adversarial conditions, such as during poor lighting conditions or poor weather conditions. Thus, the control system 12 may be able to identify gestures during such conditions.

Figure 10:
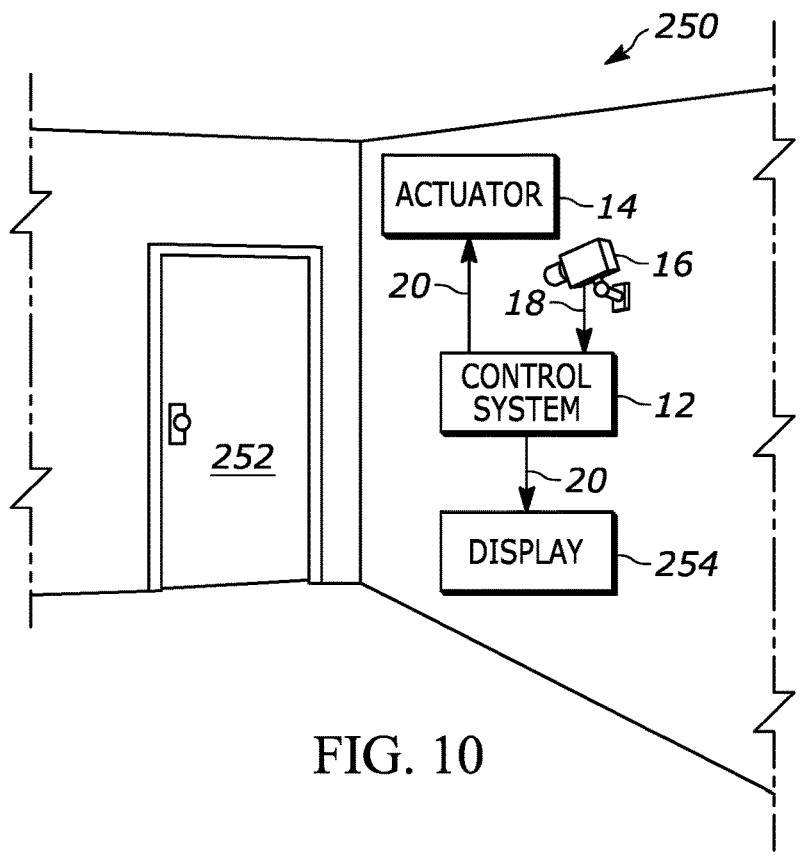
FIG. 10 depicts a schematic diagram of the control system of FIG. 1 configured to control a monitoring system, such as a control access system or a surveillance system.

FIG. 10 depicts a schematic diagram of control system 12 configured to control monitoring system 250. Monitoring system 250 may be configured to physically control access through door 252. Sensor 16 may be configured to detect a scene that is relevant in deciding whether access is granted. Sensor 16 may be an optical sensor configured to generate and transmit image and/or video data. Such data may be used by control system 12 to detect a person's face. The control system 12 may utilize joint adversarial training to help train the classifier and generator for adversarial conditions during poor lighting conditions or in the case of an intruder of an environment of the control monitoring system 250.

Classifier 24 of control system 12 of monitoring system 250 may be configured to interpret the image and/or video data by matching identities of known people stored in non-volatile storage 26, thereby determining an identity of a person. Classifier 24 may be configured to generate and an actuator control command 20 in response to the interpretation of the image and/or video data. Control system 12 is configured to transmit the actuator control command 20 to actuator 14. In this embodiment, actuator 14 may be configured to lock or unlock door 252 in response to the actuator control command 20. In other embodiments, a non-physical, logical access control is also possible.

Monitoring system 250 may also be a surveillance system. In such an embodiment, sensor 16 may be an optical sensor configured to detect a scene that is under surveillance and control system 12 is configured to control display 254. Classifier 24 is configured to determine a classification of a scene, e.g. whether the scene detected by sensor 16 is suspicious. Control system 12 is configured to transmit an actuator control command 20 to display 254 in response to the classification. Display 254 may be configured to adjust the displayed content in response to the actuator control command 20. For instance, display 254 may highlight an object that is deemed suspicious by classifier 24.

Figure 11:
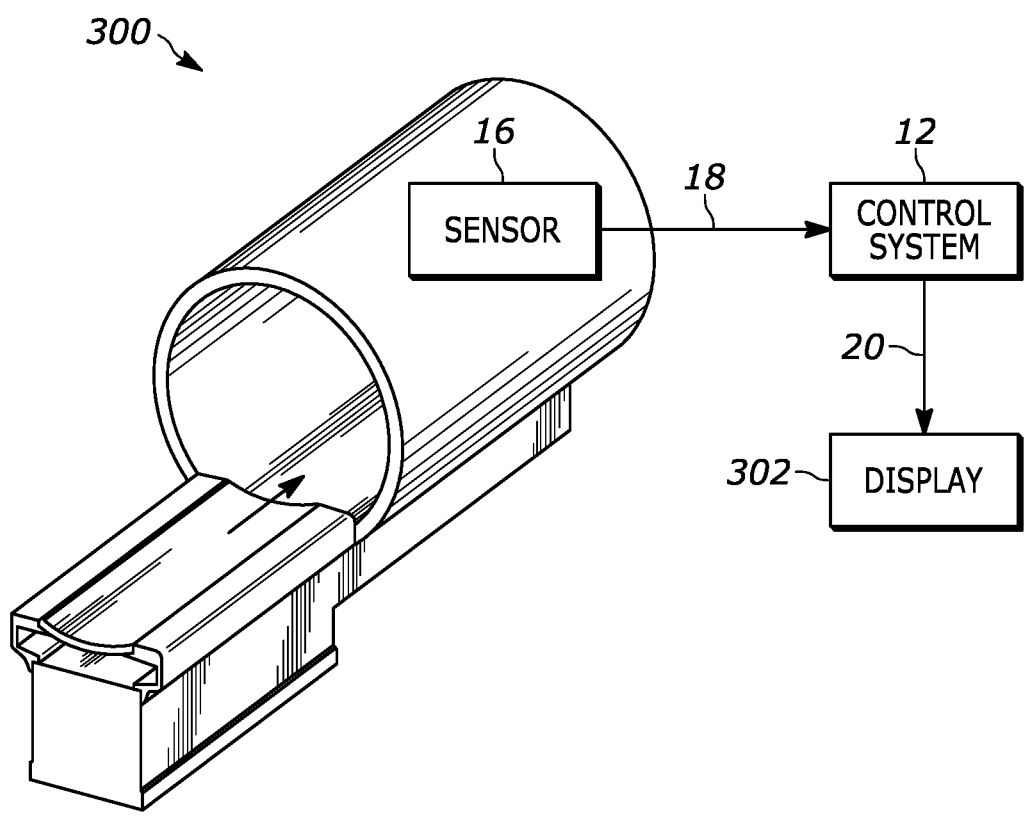
FIG. 11 depicts a schematic diagram of the control system of FIG. 1 configured to control an imaging system, for example an MRI apparatus, x-ray imaging apparatus or ultrasonic apparatus.

FIG. 11 depicts a schematic diagram of control system 12 configured to control imaging system 1100, for example an MRI apparatus, x-ray imaging apparatus or ultrasonic apparatus. Sensor 16 may, for example, be an imaging sensor. Classifier 24 may be configured to determine a classification of all or part of the sensed image. Classifier 24 may be configured to determine or select an actuator control command 20 in response to the classification obtained by the trained neural network. For example, classifier 24 may interpret a region of a sensed image to be potentially anomalous. In this case, actuator control command 20 may be determined or selected to cause display 302 to display the imaging and highlighting the potentially anomalous region. The control system 12 may utilize joint adversarial training to help train the classifier and generator for adversarial conditions during an X-ray, such as poor lighting.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for training a machine-learning network, comprising:
  receiving an input data from a sensor, wherein the input data includes a perturbation, wherein the input data is indicative of image, radar, sonar, or sound information;
  obtaining a worst-case bound on a classification error and loss for perturbed versions of the input data, utilizing at least bounding of one or more hidden layer values;
  training a classifier of a neural network associated with the machine-learning network, wherein the classifier includes a plurality of classes, including an additional abstain class, wherein the additional abstain class is determined in response to at least bounding the input data;
  outputting a classification in response to the input data indicating one of the plurality of classes; and
  outputting a trained classifier in response to exceeding a convergence threshold associated with the classifier, wherein the trained classifier is configured to detect the additional abstain class in response to obtaining the worst-case bound.

2. The computer-implemented method of claim 1, wherein the method includes classifying the input data as an abstain class in response to the input data including the perturbation or adversarial information.

3. The computer-implemented method of claim 1, wherein the plurality of classes includes original classes corresponding to the input data.

4. The computer-implemented method of claim 1, wherein the method further includes determining a hidden value upper bound and hidden value lower bound associated with a hidden value of a network layer of the machine-learning network.

5. The computer-implemented method of claim 1, wherein the one or more hidden layer values is associated with a last layer of the machine-learning network.

6. The computer-implemented method of claim 1, wherein the plurality of classes includes original classes corresponding to the input data, wherein the classifier does not classify the input data as the original classes when the input data includes perturbations.

7. The computer-implemented method of claim 1, wherein the method includes bounding a training objective function by a worst-case upper bound utilizing an interval bound propagation (IBP) technique.

8. A system including a machine-learning network, comprising:
an input interface configured to receive input data from a sensor, wherein the sensor includes a video, radar, Light Detection and Ranging LiDAR, sound, sonar, ultrasonic, motion, or thermal imaging sensor;
a processor, in communication with the input interface, wherein the processor is programmed to:
receive an input data from a sensor, wherein the input data is indicative of image, radar, sonar, or sound information;
train a classifier of a neural network associated with the machine-learning network, wherein the classifier includes a plurality of classes, including an additional abstain class, wherein the additional abstain class is determined in response to at least bounding input data including one or more perturbations; and
output a trained classifier configured to detect the additional abstain class in response to exceeding a convergence threshold associated with the classifier.

9. The system of claim 8, wherein the classifier is further configured to detect the additional abstain class in response to the input data including one or more perturbations.

10. The system of claim 8, wherein the processor is further configured to utilize interval bound propagation to compute a worst-case bound on a classification error and classification loss associated with perturbed versions of the input data.

11. The system of claim 10, wherein the processor is further configured to compute an upper bound associated with training of the machine-learning network.

12. The system of claim 8, wherein the processor is further configured to compute an upper bound and lower bound of the input data.

13. The system of claim 12, wherein the processor is further configured to compute a hidden value upper bound and hidden value lower bound associated with the hidden value of a network layer.

14. A computer-program product storing instructions which, when executed by a computer, cause the computer to:
receive input data from a sensor, wherein the sensor includes a video, radar, Light Detection and Ranging LiDAR, sound, sonar, ultrasonic, motion, or thermal imaging sensor, wherein the input data is indicative of an image;
obtain a worst case bound on a classification error and loss associated with perturbed versions of the input data, utilizing at least bounding of one or more hidden layer values;
train a classifier of a neural network associated with a machine-learning network, wherein the classifier includes a plurality of classes, including an additional abstain class, wherein the additional abstain class is determined in response to at least bounding input data including one or more perturbations; and
output a trained classifier configured to detect the additional abstain class in response to exceeding a convergence threshold associated with the classifier.

15. The computer-program product of claim 14, wherein the instructions further include operating a physical system based on output data, wherein the physical system is a computer-controlled machine, a robot, a vehicle, a domestic appliance, a power tool, a manufacturing machine, a personal assistant, or an access control system.

16. The computer-program product of claim 14, wherein the computer-program product includes further constructions that cause the computer to classify the input data as an abstain class in response to the input data including the perturbation or adversarial information.

17. The computer-program product of claim 14, wherein the plurality of classes includes original classes corresponding to a non-perturbation classification associated with the input data.

18. The computer-program product of claim 14, wherein the computer-program product includes instructions to compute an upper bound associated with training of the machine-learning network.

19. The computer-program product of claim 14, wherein the plurality of classes except the additional abstain class are utilized to classify a non-perturbation class.

20. The computer-program product of claim 14, wherein the machine-learning network is a neural network.

* * * * *